United States Patent
Kawashiro

Patent Number: 5,427,324
Date of Patent: Jun. 27, 1995

[54] SPINNING REEL FOR FISHING

[75] Inventor: Masayuki Kawashiro, Tokyo, Japan

[73] Assignee: Daiwa Seiko, Inc., Tokyo, Japan

[21] Appl. No.: 175,517

[22] Filed: Dec. 30, 1993

[30] Foreign Application Priority Data

Jan. 13, 1993 [JP] Japan .............. 5-003393 U

[51] Int. Cl.⁶ ............................................. A01K 89/00
[52] U.S. Cl. .................................... 242/241; 242/242
[58] Field of Search ............................... 242/241, 242

[56] References Cited

U.S. PATENT DOCUMENTS

| 2,515,896 | 7/1950 | Rakoczy | 242/241 |
| 4,416,428 | 11/1983 | Noda | 242/241 |
| 4,770,363 | 9/1988 | Tsunoda et al. | 242/241 |
| 5,012,990 | 5/1991 | Kawabe | 242/242 |
| 5,316,239 | 5/1994 | Sugawara | 242/241 |

FOREIGN PATENT DOCUMENTS

56-141080 10/1981 Japan .
61-6766 2/1986 Japan .

Primary Examiner—Daniel P. Stodola
Assistant Examiner—Eileen A. Dunn
Attorney, Agent, or Firm—Longacre & White

[57] ABSTRACT

A spinning reel for fishing which guides a slider slidably in a manner to restrict the play and clatter of the slider in the rotational direction by a plurality of engaging portions. The durability and strength of the slider are also enhanced. On the inner surface of the reel casing facing the slider, there are provided a first plane-shaped engaging portion and an L-shaped projecting portion, while a second engaging portion is formed on the inside surface of the projecting portion. The slider includes a first sliding contact surface for sliding contact with the first engaging portion, and a second sliding contact surface formed in a projection to be inserted into the L-shaped projecting portion for sliding contact with the second engaging portion.

8 Claims, 6 Drawing Sheets

SPINNING REEL FOR FISHING

BACKGROUND OF THE INVENTION

The present invention relates to a spinning reel for fishing having a slider used to reciprocate a spool back and forth, which prevents the unnecessary play or clatter of the slider in the rotational direction thereof.

Conventionally, there is known a spinning reel for fishing in which a spool shaft having a spool in the leading end portion thereof is mounted to a slider capable of performing back-and-forth movement converted from the rotational movement of a handle by a back-and-forth reciprocating mechanism, as disclosed, for instance, in Japanese Utility Model Publication No. Sho. 56-141080.

In the back-and-forth reciprocating mechanism, the slider is mounted on the spool shaft, and an engaging member provided in the slider is in engagement with a traverse cam groove formed in a rotary shaft. Therefore, when taking up a fishing line, when feeding out a fishing line by rotating the spool reversely, or the like, a rotative force acts on the slider through the spool and spool shaft to thereby cause play or clatter of the slider. Due to such clatter, an amount of engagement between the traverse cam groove and engaging member becomes unstable, resulting in that the components are likely to wear and are lowered in durability, and the leading end portion of the engaging member is likely to be deformed. That is, the play or clatter provides obstacles to the back-and-forth reciprocating mechanism.

In view of the above defect, there is disclosed, for instance, in Japanese Utility Model Publication No. Sho. 61-6766, a spinning reel in which the lower end portion of a slider is slidably fitted with a guide part comprising a guide rail formed on a bottom of a reel casing to thereby restrict such play or clatter of the slider.

However, the spinning reel has the following problems and thus the structure thereof is not sufficient as a guide structure for the slider.

(a) In structure, since the guide part is apart from the spool shaft, when the spool is reversely rotated by the drag braking activation at the time of taking up or feeding out a fishing line, a rotative force applied through the spool to the spool shaft adversely increases the play or clatter of the slider.

(b) Due to the fact that the guide area of the slider is small with respect to the surface of the reel casing, and also there exist only one guide surface with respect to the rotational direction, the play or clatter occurring in the rotational direction of the slider cannot be effectively minimized and such clatter cannot be restricted with sufficient strength and durability.

As described above, it is the problems to be solved by the invention that, since a force in the rotational direction is applied to the spool shaft through the spool, the slider produces large clatter, an amount of engagement between the traverse cam and engaging member is not stabilized, the traverse cam and engaging member are easy to wear and are lowered in durability, and the leading end portion of the engaging member is easy to deform.

SUMMARY OF THE INVENTION

The present invention aims at eliminating the above problems found in the conventional spinning reel for fishing. Accordingly, it is an object of the invention to provide a spinning reel for fishing which guides a slider slidable by a plurality of engaging members in a manner to restrict the play or clatter of the slider in the rotational direction thereof to thereby be able to restrict the clatter of the slider surely as well as to enhance the durability and strength of the slider.

In attaining the above object, according to the invention, there is provided a spinning reel for fishing in which a rotary shaft formed with a traverse cam groove and arranged parallel to a spool shaft is supported by a reel casing, the rotary shaft is linked with a drive gear rotatable by a handle, a slider including engaging members engageable with the traverse cam groove is slidably mounted on the rotary shaft, and the slider is fixed to the rear end portion of the spool shaft so as to reciprocate a spool mounted in the leading end portion of the spool shaft back and forth. The surface of the reel casing facing the slider includes a plurality of engaging portions for sliding and guiding the slider back and forth so as to restrict the play of the slider in the rotational direction of the rotary shaft.

The present invention further provides a structure in a fishing reel for slidably supporting a slider fixed to an end of a spool shaft and driven to linearly reciprocate together with the spool shaft by a rotary shaft formed with a cam groove and arranged in parallel relation to the spool shaft. The structure includes: a reel casing defining a first surface and a second surface opposite and parallel to the first surface, wherein the slider is held between and kept in contact with the first and second surfaces.

DETAILED DESCRIPTION OF THE PREFERRED EMBODIMENTS

Figure 1:
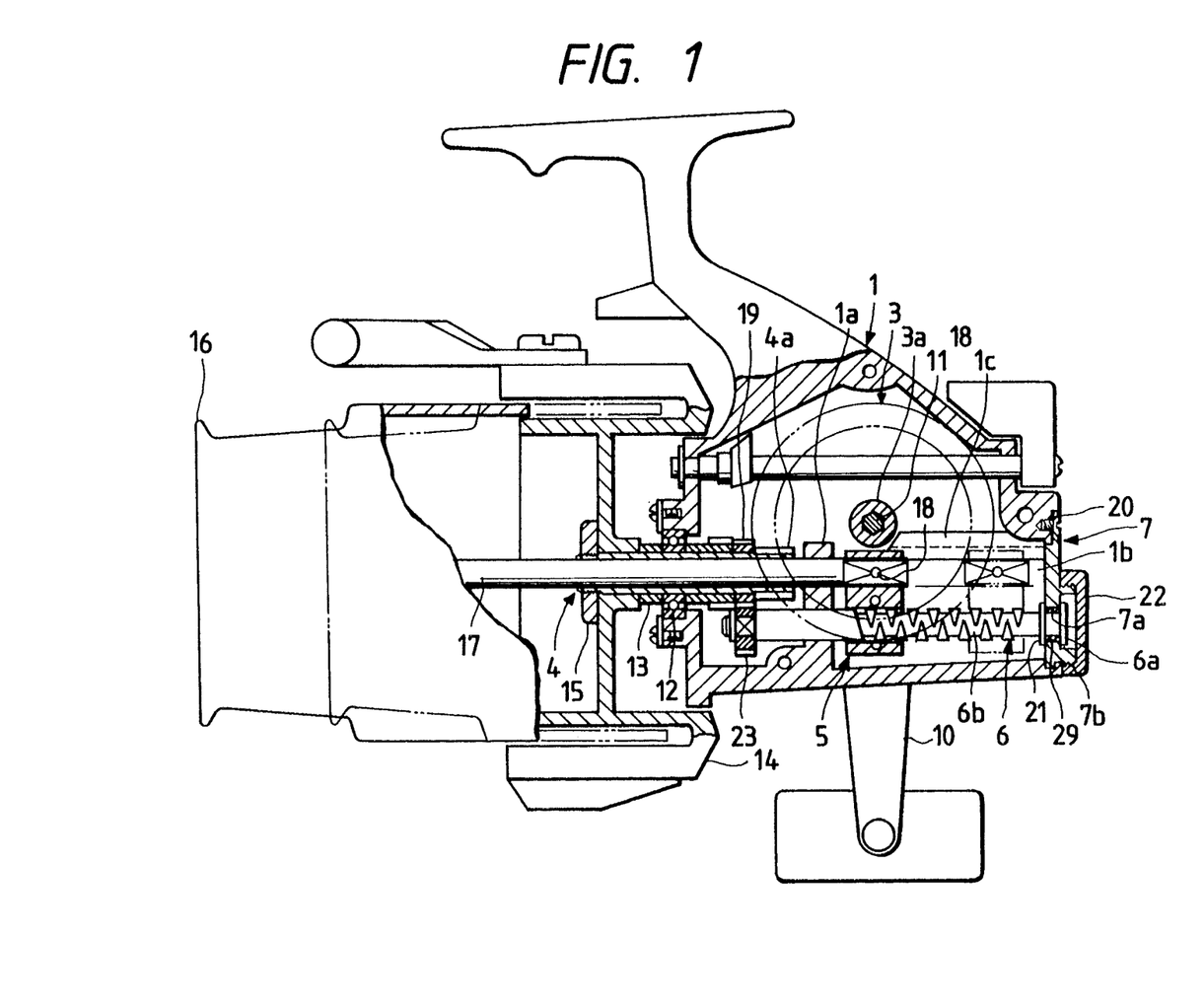
FIG. 1 is a sectional side view of main portions of a spinning reel for fishing according to a first embodiment of the present invention.
Figure 2:
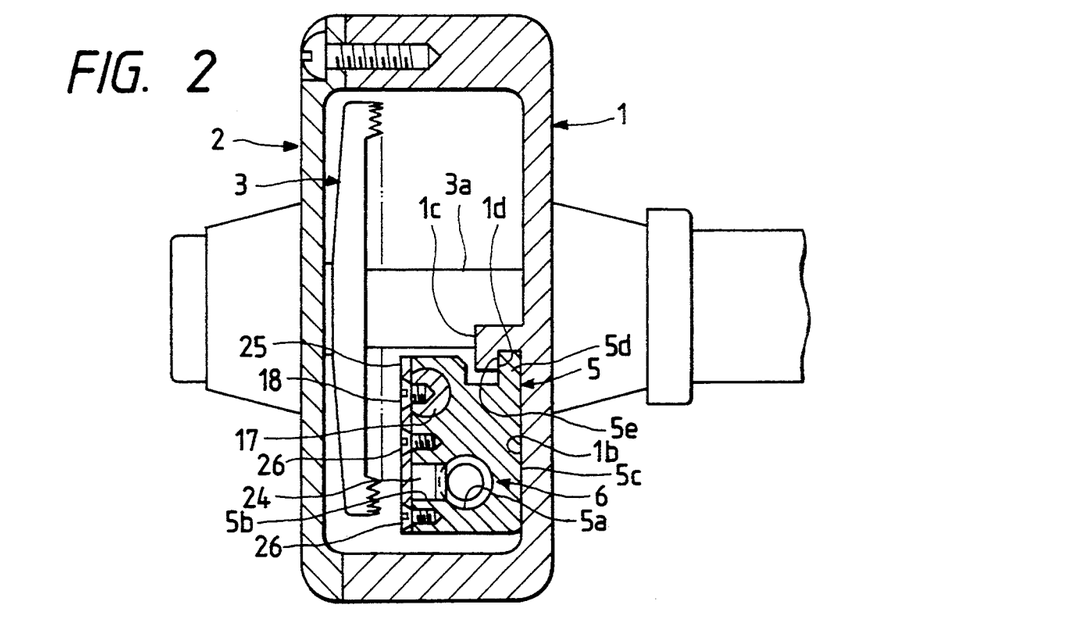
FIG. 2 is an enlarged sectional back view of main portions of the spinning reel for fishing according to the first embodiment.

Now, describing the present invention by way of the illustrated embodiments thereof, FIGS. 1 and 2 show a spinning reel for fishing according to a first embodiment of the invention. In particular, FIG. 1 is a sectional side view of main portions of the present spinning reel for fishing and FIG. 2 is an enlarged sectional back view of main portions of the present spinning reel for fishing.

In the spinning reel for fishing, a rotary shaft 3a of a drive gear 3 is journaled by both a reel casing 1 and a cover member 2 through bearings (not shown), and a handle shaft 11 with a handle 10 fixed thereto is inserted into and fitted with the central polygonal hole of the rotory shaft 3a in such a manner that the handle 11 can be exchangeably positioned at the right-hand or left-hand side with respect to the reel casing 1.

A rotary quill 4 is rotatably received by a bearing 12 in the front portion of the reel casing 1 and is also projected out forwardly. A spacer ring 13 is fitted with the outer periphery of the rotary quill 4 located upstream of the bearing 12, and a rotor is fitted with the outer periphery of the quill 4 located upstream of the spacer ring 13 and is fixed by a nut 15.

A spool shaft 17 with a spool 16 mounted to the leading end portion thereof is slidably inserted into the central hole of the rotary quill 4 in such a manner that it can be reciprocated back and forth. The rear side of the spool shaft 17 is received by a bearing portion 1a and the rotary quill 4 is rotatably received by the bearing 12 and spool shaft 17. A slider 5 is fixed to the rear end portion of the spool shaft 17 by a screw 18. A rotary shaft 6 is supported in parallel to the spool shaft 17 within the reel casing 1.

The drive gear 3 is in mesh with a pinion 4a formed integrally with the base end portion of the rotary quill 4, and the rotor 14 is supported such that it can be rotated in linking with the rotation of the handle 10.

Forwardly of the pinion 4a of the rotary quill 4 within the reel casing 1, a linking gear 19 is non-rotatively fitted with the rotary quill 4.

The rotary shaft 6 is journaled by the bearing portion 1a and by a two-part bearing metal 29 fitted into a bearing hole 7a formed in a hold part 7 which is mounted to the rear side of the reel casing by a screw 20, and the rotary shaft 6 is prevented against slippage by a flange portion 6a and an E ring 21. The hold part 7 includes on the rear side surface thereof a threaded portion 7b which is threadedly engageable with a cover 22. The rotary shaft 6 includes a traverse cam groove 6b formed on the outer periphery thereof.

A pinion 23 is non-rotatively fitted with the leading end portion of the rotary shaft 6, and is also in mesh with the linking gear 19.

A through hole 5a formed in the slider 5 is fitted with the rotary shaft 6 and an engaging member 24 is inserted into a recessed portion 5b formed in the slider 5 and is in engagement with the traverse cam groove 6b. A slippage preventive plate 25 is mounted on one side surface of the slider 5 by screws 26.

On one inner surface of the reel casing i facing the slider 5, there are provided a first engaging portion 1b in the form of a plane and an L-shaped projecting portion 1c and, internally of the projecting portion 1c, there is formed a second engaging portion 1d.

The slider 5 includes a first sliding contact surface 5c for sliding contact with the first engaging portion 1b and a second sliding contact surface 5e which is formed in a projection 5d to be inserted into the L-shaped projecting portion 1c for sliding contact with the second engaging portion 1d.

When the slider 5 is assembled into the reel casing 1, the slider 5 is inserted into the reel casing 1 from behind before the cover member 2, drive gear 3 and hold part 7 are mounted thereto, and then the hold part 7 with one end of the rotary shaft 6 mounted thereto is mounted to the reel casing 1.

Referring now to the operation of the abovementioned spinning reel for fishing, if the handle 10 is rotated, then the drive gear 3 is rotated and thus the rotary quill 4 is rotated through the pinion 4a, so that the rotor 14 can be rotated. Further, the rotary shaft 6 is linkingly rotated through the linking gear 19 and pinion 23, which causes the slider 5 and spool shaft 17 to reciprocate back and forth together.

With loads applied to the rotor 14 and the spool shaft 17 including a spool 16 in the leading end portion thereof, if a fishing line is taken up, or if a fishing line is fed out by reversely rotating the spool, then a force in the rotational direction is applied to the spool shaft 17 and thereby a force in the rotational direction is applied to the slider 5 as well. However, the first engaging portion 1b and the second engaging portion 1d are formed on the inner surface of the reel casing 1 facing the slider 5 and the first sliding contact surface 5c and second sliding contact surface 5e are formed in the slider 5, in such a manner that the engaging portions 1b and 1d can be brought into sliding contact with the sliding contact surfaces 5c and 5e respectively to eliminate any dimensional play between them. This prevents generation of clatter between the interior of the reel casing 1 and slider 5, so that the slider 5 can be slid back and forth smoothly.

When the spinning reel for fishing is structured in the above-mentioned manner, then the first and second engaging portions 1b and 1d of the reel casing 1 facing the slider 5 can be respectively brought into sliding contact with the first and second sliding contact surfaces 5c and 5e of the slider 5 to thereby eliminate the possibility of any dimensional play being produced between them. This makes it possible to minimize clatter between the interior of the reel casing 1 and the slider 5 surely and thus the slider 5 can be guided slidably without any clatter. As a result, an amount of engagement between the traverse cam groove 6b and engaging member 24 can be stabilized. That is, the durability and strength of the rotary shaft 6 and slider 5 can be improved.

Figure 3:
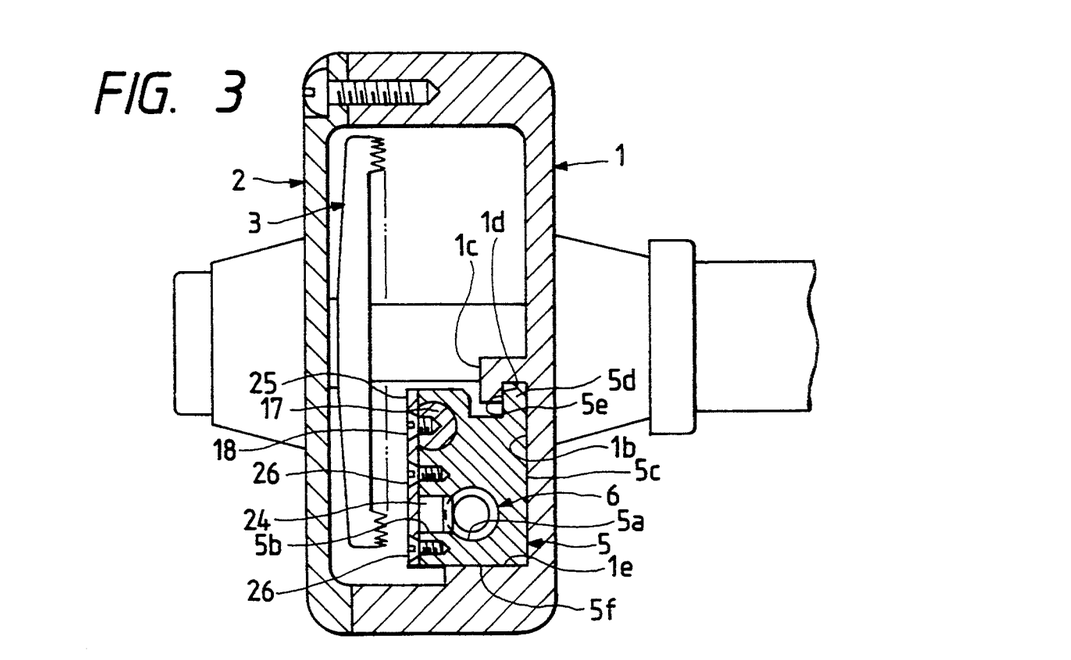
FIG. 3 is an enlarged sectional back view of main portions of a spinning reel for fishing according to a second embodiment of the present invention.

Now, in FIG. 3, there is shown a sectional back view of main portions of a spinning reel for fishing according to a second embodiment of the invention.

In the second embodiment, similarly to the first embodiment, on the inner surface of the reel casing 1 facing the slider 5, there are formed a first plane-shaped engaging portion 1b and an L-shaped projecting portion 1c, a second engaging 1d is formed inwardly of the projecting portion 1c, and a third engaging portion 1e is formed on the bottom surface of the interior of the reel casing 1.

The slider 5 includes a first sliding contact surface 5c for sliding contact with the first engaging portion 1b, a second sliding contact surface 5e formed in a projection 5d to be inserted into the L-shaped projecting portion 1c for sliding contact with the second engaging portion 1b, and a third sliding contact surface 5f for sliding contact with the third engaging portion 1e.

The remaining portions of the structure of the second embodiment is substantially the same as the abovementioned first embodiment.

In the second embodiment, if the handle 10 is rotated, then the drive gear 3 is rotated and thus the rotary quill 4 is rotated through the pinion 4a, so that the rotator 14 can be rotated. Further, the rotary shaft 6 is linkingly rotated through the linking gear 19 and pinion 23 to thereby cause the slider 5 and spool shaft 17 to reciprocate back and forth. With loads applied to the rotor 14 and to the spool shaft 17 having the spool 16 in the leading end portion thereof, when a fishing line is taken up, or when a fishing line is fed out by reversely rotating the spool, then a force in the rotational direction is applied to the spool shaft 17 and thereby a force in the rotational direction is applied to the slider 5. However, the first, second and third engaging portions 1b, 1d and 1e respectively formed on the inner surface of the reel casing 1 facing the slider 5 are respectively in sliding contact with the first, second and third sliding contact surfaces 5c, 5e and 5f respectively provided on the slider 5 to eliminate the possibility of any dimensional play being produced between the interior of the reel casing 1 and slider 5 and, as a result of this, no play is produced between the interior of the reel casing 1 and slider 5, so that the slider 5 can be smoothly slid back and forth.

Figure 4:
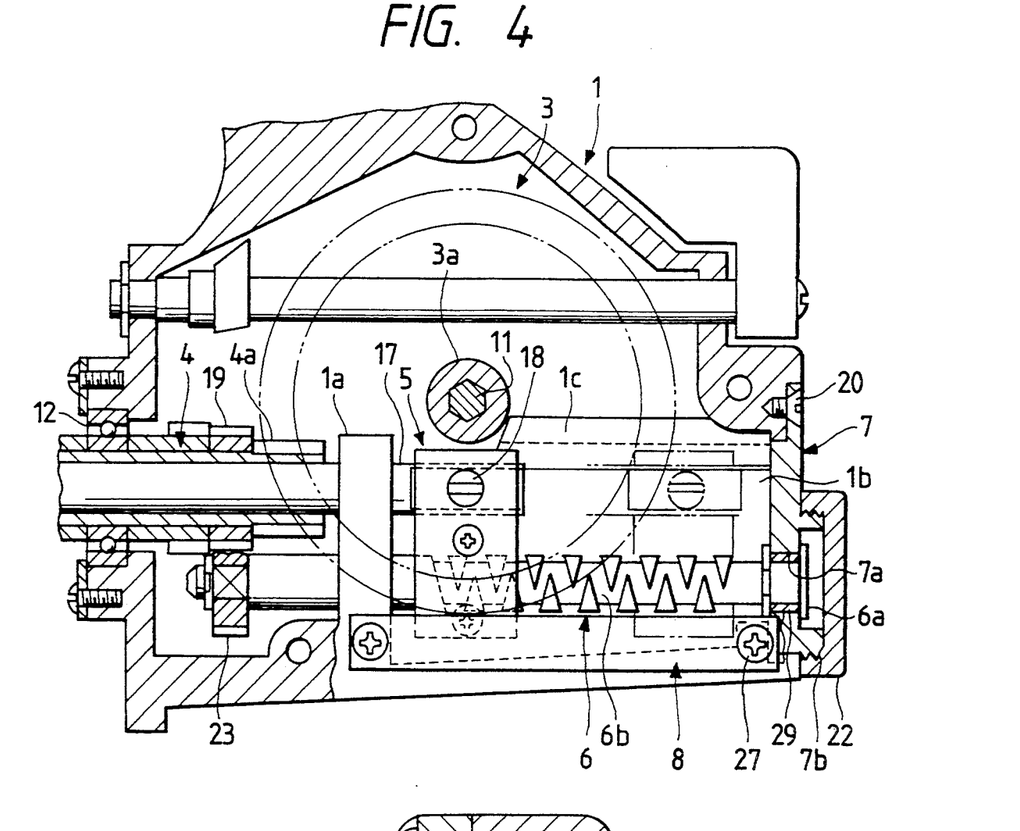
FIG. 4 is an enlarged sectional side view of main portions of a spinning reel for fishing according to a third embodiment of the present invention.
Figure 5:
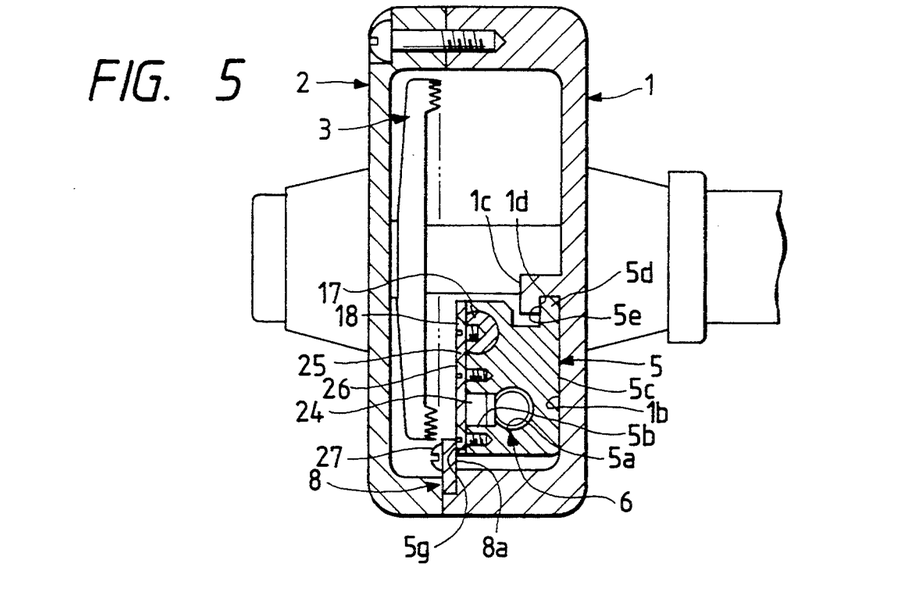
FIG. 5 is an enlarged sectional back view of main portions of the spinning reel for fishing according to the third embodiment.

Referring now to FIGS. 4 and 5, there is shown a spinning reel for fishing according to a third embodiment of the invention. In particular, in FIG. 4, there is shown an enlarged sectional side view of main portions of the spinning reel for fishing and, in FIG. 5, there is shown an enlarged sectional back view of main portions of the spinning reel for fishing.

In the third embodiment, similarly to the first embodiment, a first plane-shaped engaging portion 1b and an L-shaped projecting portion 1c are provided on the inner surface of the reel casing 1 facing the slider 5, a second engaging portion 1d is formed inwardly of the projecting portion 1c, and an engaging plate 8 is mounted on the bottom surface side of the interior of the reel casing 1 by a screw 27.

A fourth engaging portion 8a formed on the inside portion of the engaging plate 8 is in contact with a fourth sliding contact surface 5g of the slider 5 which is formed by a slippage preventive plate 25 mounted on one side surface of the slider 5.

The slider 5 includes a fist sliding contact surface 5c for sliding contact with the first engaging portion 1b, a second sliding contact surface 5e which is formed in a projection 5d to be inserted into the L-shaped projecting portion 1c for sliding contact with the second engaging portion 1d, and a fourth sliding contact surface 5g formed by the slippage preventive plate 25.

The remaining portions of the structure of the third embodiment are substantially the same as those of the above-mentioned first embodiment.

In the third embodiment, if the handle 10 is turned, then the drive gear 3 is rotated and thus the rotary quill 4 is rotated through the pinion 4a, so that the rotor 14 can be rotated. Further, the rotary shaft 6 is linkingly rotated through a linking gear 19 and a pinion 23, which causes the slider 5 and spool shaft 17 to reciprocate back and forth. With loads applied to the rotor 14 and to the spool shaft 17 having the spool 16 in the leading end portion thereof, when a fishing line is taken up, or when a fishing line is played out by reversely rotating the spool, then a force in the rotational direction is applied to the spool shaft 17 and thereby a force in the rotational direction is applied to the slider 5. However, the first, second and fourth engaging portions 1b, 1d and 8a respectively formed on the inner surface of the reel casing 1 facing the slider 5 are respectively in sliding contact with the first, second and fourth sliding contact surfaces 5c, 5e and 5g respectively provided on the slider 5 to eliminate the possibility of any dimensional play being produced between interior of the reel casing 1 and slider 5 and, therefore, no play is produced between the interior of the reel casing 1 and slider 5, so that the slider 5 can be smoothly slid back and forth.

Figure 6:
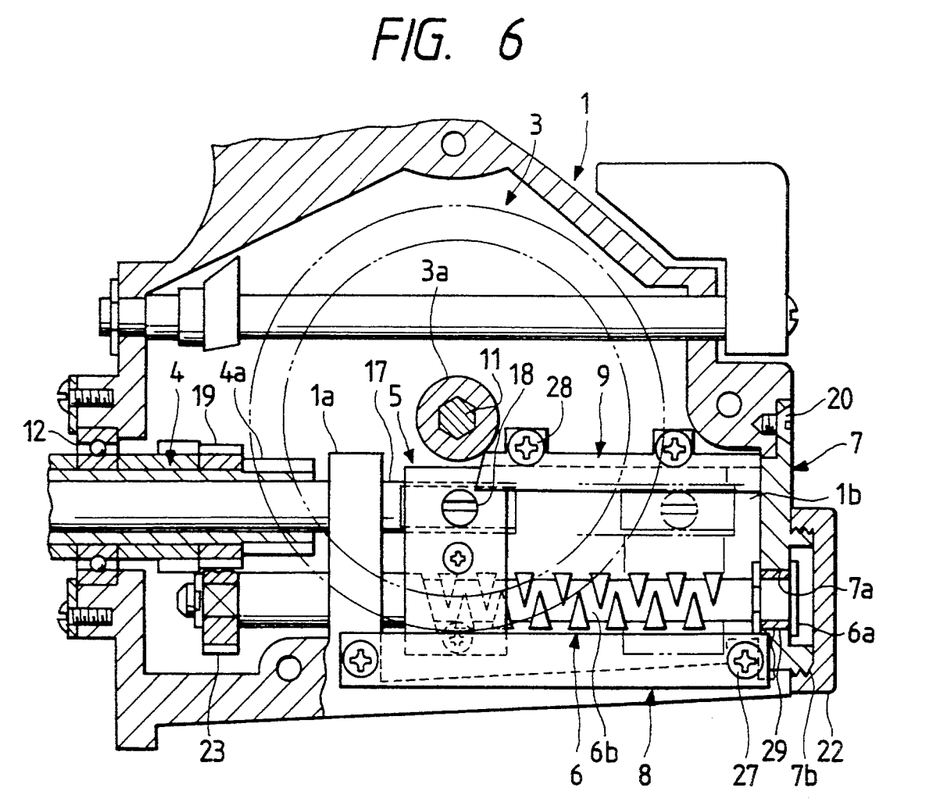
FIG. 6 is an enlarged sectional side view of main portions of a spinning reel for fishing according to a fourth embodiment of the invention.
Figure 7:
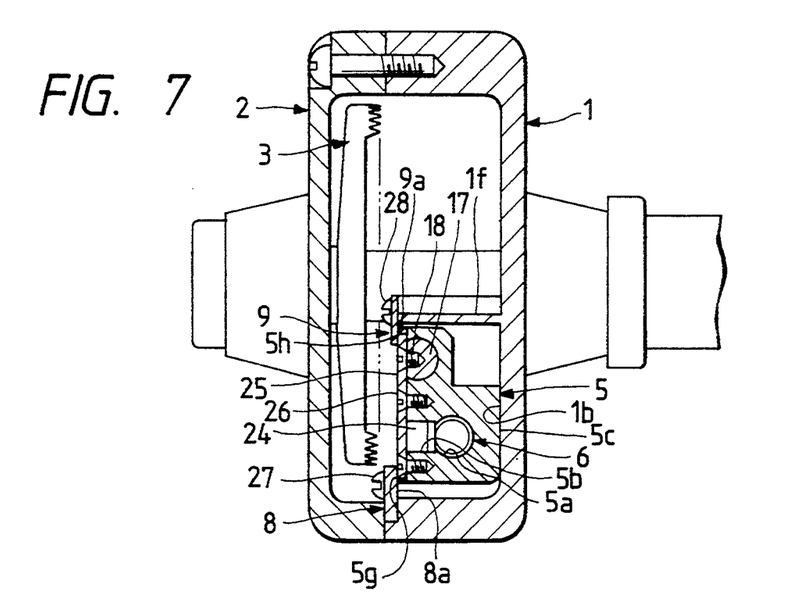
FIG. 7 is an enlarged sectional back view of main portions of the spinning reel for fishing according to the fourth embodiment.

Referring now to FIGS. 6 and 7, there is shown a spinning reel for fishing according to a fourth embodiment of the invention. In particular, FIG. 6 is an enlarged sectional side view of main portions of the spinning reel for fishing, while FIG. 7 is an enlarged sectional back view of main portions of the spinning reel for fishing.

In the fourth embodiment, on the inner surface of the reel casing 1 facing the slider 5, there are formed a first plane-shaped engaging portion 1b and a projecting portion 1f, and an engaging plate 9 is mounted to the projecting portion 1f by a screw 28.

An engaging plate 8 is mounted on the bottom surface side of the interior of the reel casing 1 by a screw 27.

A fourth engaging portion 8a formed on the inside portion of the engaging plate 8 is in contact with a fourth sliding contact surface 5g formed by a slippage preventive plate 25 mounted on one side surface of the slider 5.

A fifth engaging portion 9a formed on the inside portion of the engaging plate 9 is in contact with a fifth sliding contact surface 5h formed by a slippage preventive plate 25 mounted on one side surface of the slider 5.

The slider 5 includes a first sliding contact surface 5c for sliding contact with the first engaging portion 1b, a fourth sliding contact surface 5g formed by the slippage preventive plate 25, and a fifth sliding contact surface 5h formed by the slippage preventive plate 25.

The remaining portions of the structure of the fourth embodiment are substantially the same as those of the above-mentioned first embodiment.

In the fourth embodiment, if the handle 10 is rotated, then the drive gear 3 is rotated and thus the rotary quill 4 is rotated through the pinion 4a, so that the rotor 14 can be rotated. Further, the rotary shaft 6 is linkingly rotated through the linking gear 19 and pinion 23 so that the slider 5 and spool shaft 17 are reciprocated back and forth. With loads applied to the rotor 14 and to the spool shaft 17 having the spool 16 in the leading end portion thereof, when a fishing line is taken up, or when a fishing line is played out by reversely rotating the spool, then a force in the rotational direction is applied to the spool shaft 17 and thereby a force in the rotational direction is applied to the slider 5. However, a first engaging portion 1b, a fourth engaging portion 8a on the inside of the engaging plate 8, and a fifth engaging portion 9a on the inside of the engaging plate 9 respectively formed on the inner surface of the reel casing 1 facing the slider 5 are respectively in sliding contact with a first sliding contact surface 5c, a fourth sliding contact surface 5g formed by the slippage preventive plate 25 and a fifth sliding contact surface 5h formed by the slippage preventive plate 25 respectively provided on the slider 5 to thereby eliminate the possibility of any dimensional play being produced between interior of the reel casing 1 and slider 5 and, therefore, no play is produced between the interior of the reel casing 1 and slider 5, so that the slider 5 can be smoothly slid back and forth.

Figure 8:
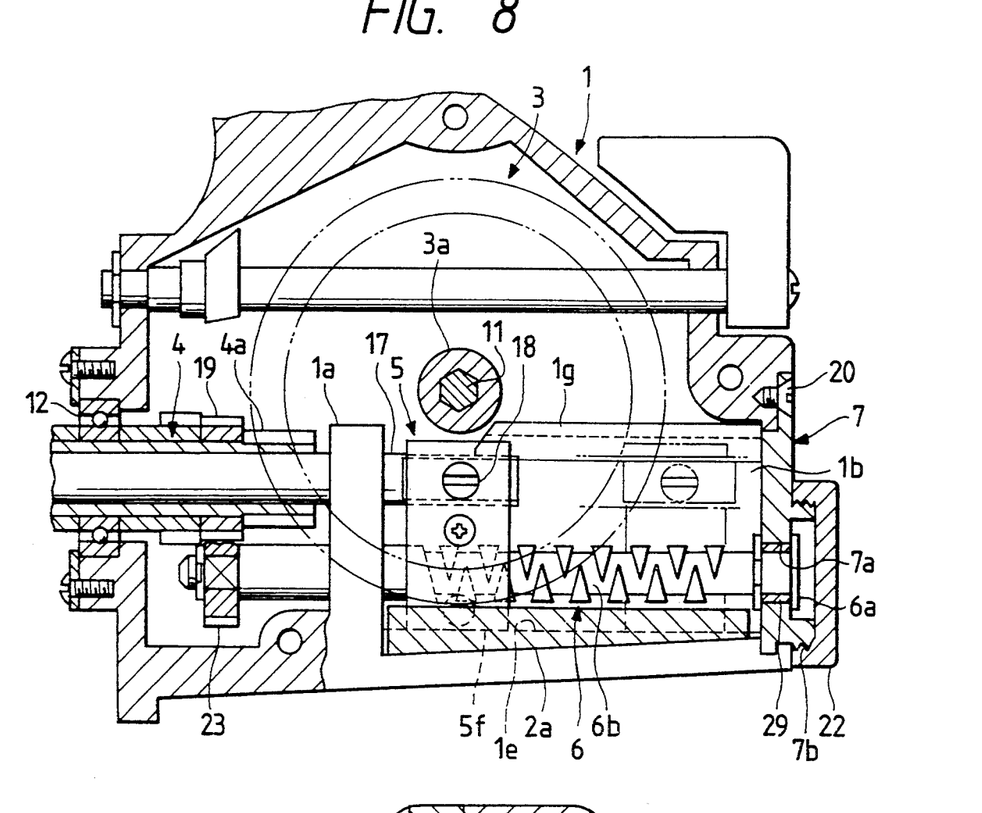
FIG. 8 is an enlarged sectional side view of main portions of a spinning reel for fishing according to fifth embodiment of the invention.
Figure 9:
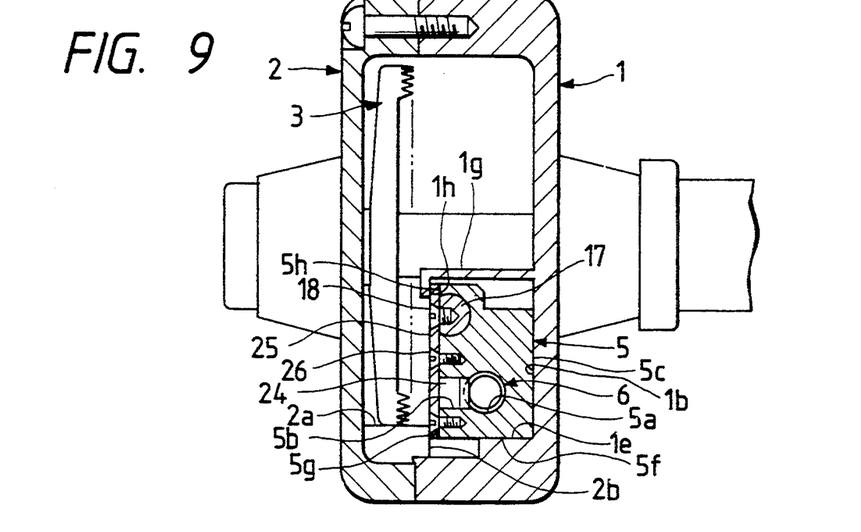
FIG. 9 is an enlarged sectional back view of main portions of the spinning reel for fishing according to the fifth embodiment.

Now, in FIGS. 8 and 9, there is shown a spinning reel for fishing according to a fifth embodiment of the invention. In particular, FIG. 8 is an enlarged sectional side view of main portions of the spinning reel for fishing and FIG. 9 is an enlarged sectional back view of main portions of the spinning reel for fishing.

In the fifth embodiment, a first plane-shaped engaging portion 1b is formed on the inner surface of the reel casing 1 facing the slider 5, a third engaging portion 1e is formed on the bottom surface of the inside of the reel casing 1, a long L-shaped projecting portion 1g is provided on the inner surface of the reel casing 1 facing the slider 5, and a sixth engaging portion 1h is formed on the inside of the projecting portion 1g.

The cover member 2 includes a projecting portion 2a in the direction of the slider 5 within the reel casing 1 and a seventh engaging portion 2b is formed on the inside of the projecting portion 2a.

The slider 5 includes a first sliding contact surface 5c for sliding contact with the first engaging portion 1b, a third sliding contact surface 5f for sliding contact with the third engaging portion 1e, a fifth sliding contact surface 5h formed by a slippage preventive plate 25 disposed on one side surface of the slider 5 for sliding contact with the sixth engaging portion 1h, and a fourth sliding contact surface 5g formed by the preventive plate 25 on one side surface of the slider 5 for sliding contact with the seventh engaging portion 2b.

The remaining portions of the structure of the fifth embodiment are substantially the same as those of the above-mentioned first embodiment.

In the fifth embodiment, if the handle is rotated, then the drive gear 3 is rotated and thus the rotary quill 4 is rotated thought the pinion 4a, so that the rotor 14 can be rotated. Further, the rotary shaft 6 is linkingly rotated through the linking gear 19 and pinion 23 so that the slider 5 and spool shaft 17 are reciprocated back and forth. With loads applied to the rotor 14 and to the spool shaft 17 having the spool 16 in the leading end portion thereof, when a fishing line is taken up, or when a fishing line is played out by reversely rotating the spool, then a force in the rotational direction is applied to the spool shaft 17 and thereby a force in the rotational direction is applied to the slider 5. However, a first engaging portion 1b, a third engaging portion 1e, a sixth engaging portion 1h and a seventh engaging portion 2b respectively provided on the inner surface of the reel casing 1 facing the slider 5 are respectively in sliding contact with a first sliding contact surface 5c, a third sliding contact surface 5f, a fourth sliding contact surface 5g formed by a slippage preventive plate 25, and a fifth sliding contact surface 5h formed by the slippage preventive plate 25 respectively provided in the slider 5 to thereby eliminate the possibility of any dimensional play being produced between the interior of the reel casing 1 and the slider 5. For this reason, no play can be produced between the interior of the reel casing 1 and the slider 5, so that the slider 5 can be smoothly slid back and forth.

Figure 10:
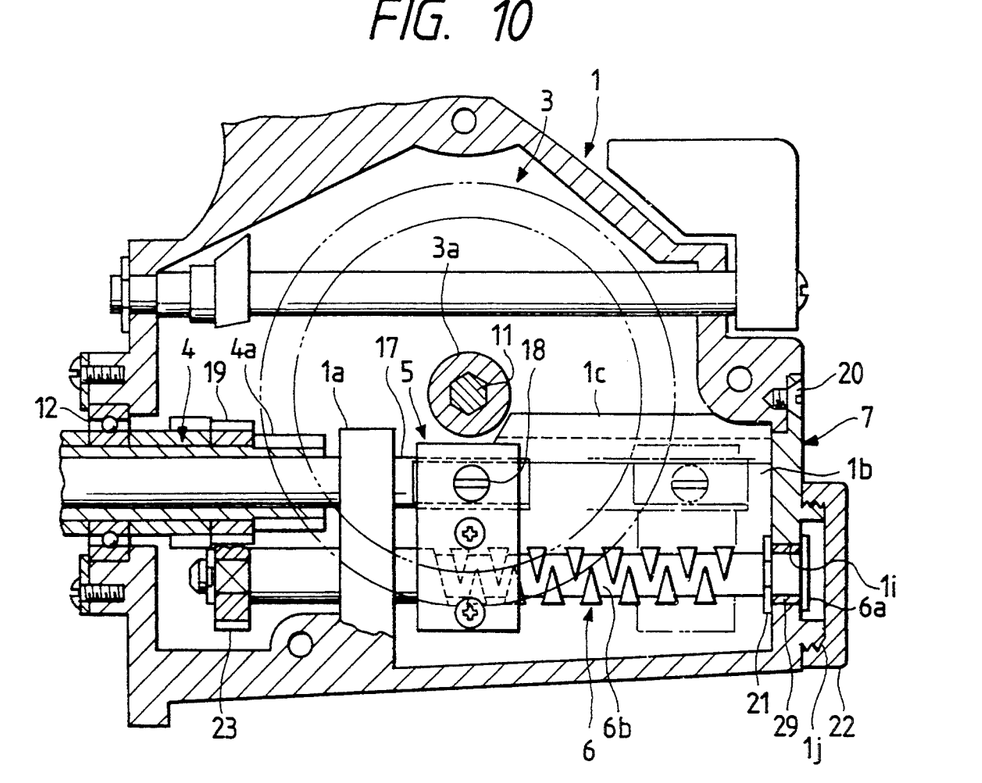
FIG. 10 is an enlarged sectional side view of main portions of a spinning reel for fishing according to a sixth embodiment of the invention.
Figure 11:
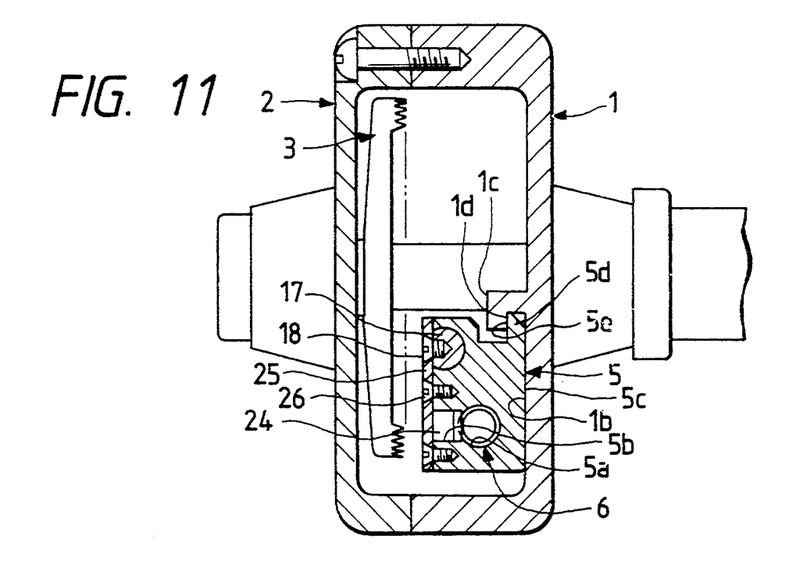
FIG. 11 is an enlarged sectional back view of main portions of the spinning reel for fishing according to the sixth embodiment.

Referring now to FIGS. 10 and 11, there is shown a spinning reel for fishing according to a sixth embodiment of the invention. In particular, FIG. 10 is an enlarged sectional side view of main portions of the spinning reel for fishing and FIG. 11 is an enlarged sectional back view of main portions of the spinning reel for fishing.

The sixth embodiment is a modified version of the first embodiment. In the sixth embodiment, the hold part 7 of the first embodiment is not used but a two-part bearing metal 29 is fitted into a bearing hole 1i formed on the rear side portion of the reel casing 1, and thus the rotary shaft 6 is received by the bearing 1a and bearing metal 29 and is prevented against slippage by the flange portion 6a and E ring 21.

The reel casing 1 includes on the rear surface thereof a threaded portion 1j with which a cover 22 is threadedly engageable. The reel casing 1 further includes a bottom surface which is formed thin in thickness.

Due to the thin thickness of the bottom surface, a clearance between the bottom surface of the reel casing 1 and the lower surface of the slider 5 can be made greater than the meshing depth between a second engaging portion 1d formed on the inside of a projecting portion 1c of the reel casing 1 and a projection 5d provided in the slider 5.

The remaining portions of the structure and operation of the sixth embodiment are substantially the same as those of the first embodiment.

When the slider 5 is assembled into the reel casing 1, the slider 5 is inserted into the reel casing 1 from the cover member side before the cover member 2 and drive gear 3 are mounted to the reel casing 1, the slider 5 is then lifted upwardly and the spool shaft 17 and rotary shaft 6 are inserted into the through hole formed in the slider 5, respectively.

As has been described heretofore, according to the invention, since a plurality of engaging portions provided on the inner surface of the reel casing facing the slider are respectively in sliding contact with a plurality of sliding contact surfaces provided on the slider to thereby eliminate the possibility of any dimensional play being produced between them, it is possible to restrict or prevent generation of play between the interior of the reel casing and slider so that the slider can be slidably guided with no play produced. Thanks to this, an amount of engagement between the traverse cam groove and engaging member can be stabilized and also the durability and strength of the spinning reel can be improved. That is, the invention can provide a spinning reel for fishing which has excellent practical effects.

What is claimed is:

1. A structure in a fishing reel for slidably supporting a slider fixed to an end of a spool shaft and driven to linearly reciprocate together with said spool shaft by a rotary shaft formed with a cam groove and arranged in parallel relation to said spool shaft, said structure comprising:

a reel casing defining a first surface and a second surface opposite and parallel to said first surface, wherein said slider is held between and kept in contact with said first and second surfaces, wherein at least one of said first and second surfaces is located above a longitudinal axis of said spool shaft with respect to said rotary shaft.

2. The structure according to claim 1, wherein said reel casing further defines a third surface substantially perpendicular to said first surface, said third surface being kept in contact with said slider.

3. The structure according to claim 1, wherein said slider defines a first contact surface and a second contact surface opposite from and parallel to said first contact surface, and wherein said first contact surface is entirely contacted with first surface of said reel casing, whereas said second contact surface is partially contacted with said second surface.

4. A structure in a fishing reel for slidably supporting a slider fixed to an end of a spool shaft and driven to linearly reciprocate together with said spool shaft by a rotary shaft formed with a cam groove and arranged in parallel relation to said spool shaft, said structure comprising:

a reel casing defining a first surface and a second surface opposite and parallel to said first surface, wherein said slider is held between and kept in contact with said first and second surfaces, wherein a L-shaped surface is formed on a portion of said first surface so that a distal portion of said L-shaped surface defines said second surface.

5. The structure according to claim 4, wherein said slider includes a projection adapted to be slidably clamped by said first and second surfaces.

6. A structure in a fishing reel for slidably, supporting a slider fixed to an end of a spool shaft and driven to linearly reciprocate together with said spool shaft by a rotary shaft formed with a cam groove and arranged in parallel relation to said spool shaft, said structure comprising:

a reel casing defining a first surface and a second surface opposite and parallel to said first surface, wherein said slider is held between and kept in contact with said first and second surfaces, wherein said reel casing includes a cover attached to a portion of said reel casing, and wherein said cover defines said second surface.

7. A spring reel for fishing, comprising:

a rotary shaft having a traverse cam groove, which is supported in parallel to a spool shaft in a reel casing, the rotary shaft being linked with a drive gear rotatable by a handle; and a slider including an engaging member, which is engageable with the traverse cam groove through said engaging member and is arranged to be slidable with respect to said rotary shaft, the slider being fixed to the rear end portion of said spool shaft to reciprocate back and forth together with a spool mounted on a leading end portion of the spool shaft, wherein:

an inner surface of said reel casing facing said slider is formed into a plurality of engaging portions for sliding and guiding said slider back and forth, at least one of said engaging portions being located above a longitudinal axis of said spool shaft with respect to said rotary shaft to thereby restrict the clatter of said slider in the rotational direction of said rotary shaft.

8. The spinning reel according to claim 7, wherein a L-shaped projection is formed on said inner surface of said reel casing to define one of said plurality of engaging portions.

* * * * *